(12) United States Patent
Willson et al.

(10) Patent No.: US 9,303,355 B2
(45) Date of Patent: Apr. 5, 2016

(54) MODE SHIFT APPARATUS FOR UMBILICAL STRANDING MACHINE

(71) Applicant: Bartell Machinery Systems, L.L.C., Rome, NY (US)

(72) Inventors: Rodney Joseph Willson, Ava, NY (US); Michael Eric Buisman, New Hartford, NY (US)

(73) Assignee: Bartell Machinery Systems, L.L.C., Rome, NY (US)

( * ) Notice: Subject to any disclaimer, the term of this patent is extended or adjusted under 35 U.S.C. 154(b) by 335 days.

(21) Appl. No.: 14/014,846

(22) Filed: Aug. 30, 2013

(65) Prior Publication Data

US 2014/0087912 A1 Mar. 27, 2014

Related U.S. Application Data

(60) Provisional application No. 61/698,144, filed on Sep. 7, 2012.

(51) Int. Cl.
*D07B 7/06* (2006.01)
*F16H 3/44* (2006.01)
*H01B 13/02* (2006.01)

(52) U.S. Cl.
CPC .. *D07B 7/06* (2013.01); *F16H 3/44* (2013.01); *H01B 13/0207* (2013.01)

(58) Field of Classification Search
CPC ........ D07B 7/06; F16H 3/44; H01B 13/0207; H01B 13/0214
USPC ....................................................... 57/60, 65
See application file for complete search history.

(56) References Cited

U.S. PATENT DOCUMENTS

| | | | | | |
|---|---|---|---|---|---|
| 3,196,601 | A | * | 7/1965 | Haugwitz | B65H 57/14 57/60 |
| 3,448,569 | A | * | 6/1969 | Rose | D07B 3/06 57/15 |
| 4,426,835 | A | * | 1/1984 | Ito | D07B 7/06 242/129.6 |
| 4,604,860 | A | * | 8/1986 | Matsuura | D07B 1/0693 57/311 |
| 4,604,861 | A | * | 8/1986 | Matsuura | D07B 1/0693 57/311 |
| 5,282,353 | A | * | 2/1994 | Kellstrom, Jr. | D07B 7/04 476/36 |
| 8,079,205 | B2 | * | 12/2011 | Nava | B65H 81/08 57/13 |
| 2006/0107644 | A1 | * | 5/2006 | Dye | A61N 1/05 57/13 |

* cited by examiner

*Primary Examiner* — Shaun R Hurley
(74) *Attorney, Agent, or Firm* — Brinks Gilson & Lione (57) ABSTRACT

A coupler for shifting bobbin cradle sets between planetary and rigid mode positions on an umbilical standing machine includes a lever, a pinion gear, and a line shaft positioned through a center of the pinion gear and a cage of the stranding machine. A coupler block is slidable over the line shaft and engageable with the pinion gear to rotate a set of bobbin cradles via the pinion gear and the line shaft. Opposing cam followers controllable with the lever engage splines of the coupler block to shift the coupler block back and forth between being coupled to the pinion gear for planetary mode and coupled to the cage for rigid mode. Hollow sections on either side of the coupler block may engage lugs attached to the pinion gear and the cage, for attachment in planetary and rigid modes, respectively.

19 Claims, 14 Drawing Sheets

MODE SHIFT APPARATUS FOR UMBILICAL STRANDING MACHINE

RELATED APPLICATION

This application claims the benefit of priority to U.S. Provisional Patent Application No. 61/698,144, filed Sep. 7, 2012.

BACKGROUND

Umbilical standing machines are used for winding wire into an armoring shield around a pipe or other bundle. The winding creates an overlapping pattern and may be wound around cylindrical or tubular structures of different sizes. These structures may include cables or piping up to several inches in diameter.

Planetary stranding machines use a planetary motion while rigid armoring machines use a rigid armoring motion. The winders on these machines include spools of steel or other metal, such as copper, arranged in a circle or ring. The pipe or cable to be wrapped extends through the center and the circle or ring of spools spins around the pipe or cable. The metal wire is delivered to the pipe or cable while being pulled tight, to thus wind the metal wire around the pipe or cable. The metal wire may be round wire or flat wire.

DETAILED DESCRIPTION OF THE DRAWINGS AND THE PRESENTLY PREFERRED EMBODIMENTS

The present disclosure relates to an umbilical stranding machine, and more particularly to a mode shift apparatus for seamlessly transitioning between a planetary motion and a rigid armoring motion for stranding metal cables or pipes and the like. In the following passages, different aspects of the disclosure are defined in more detail. Each aspect so defined may be combined with any other aspect or aspects unless clearly indicated to the contrary.

Figure 10:
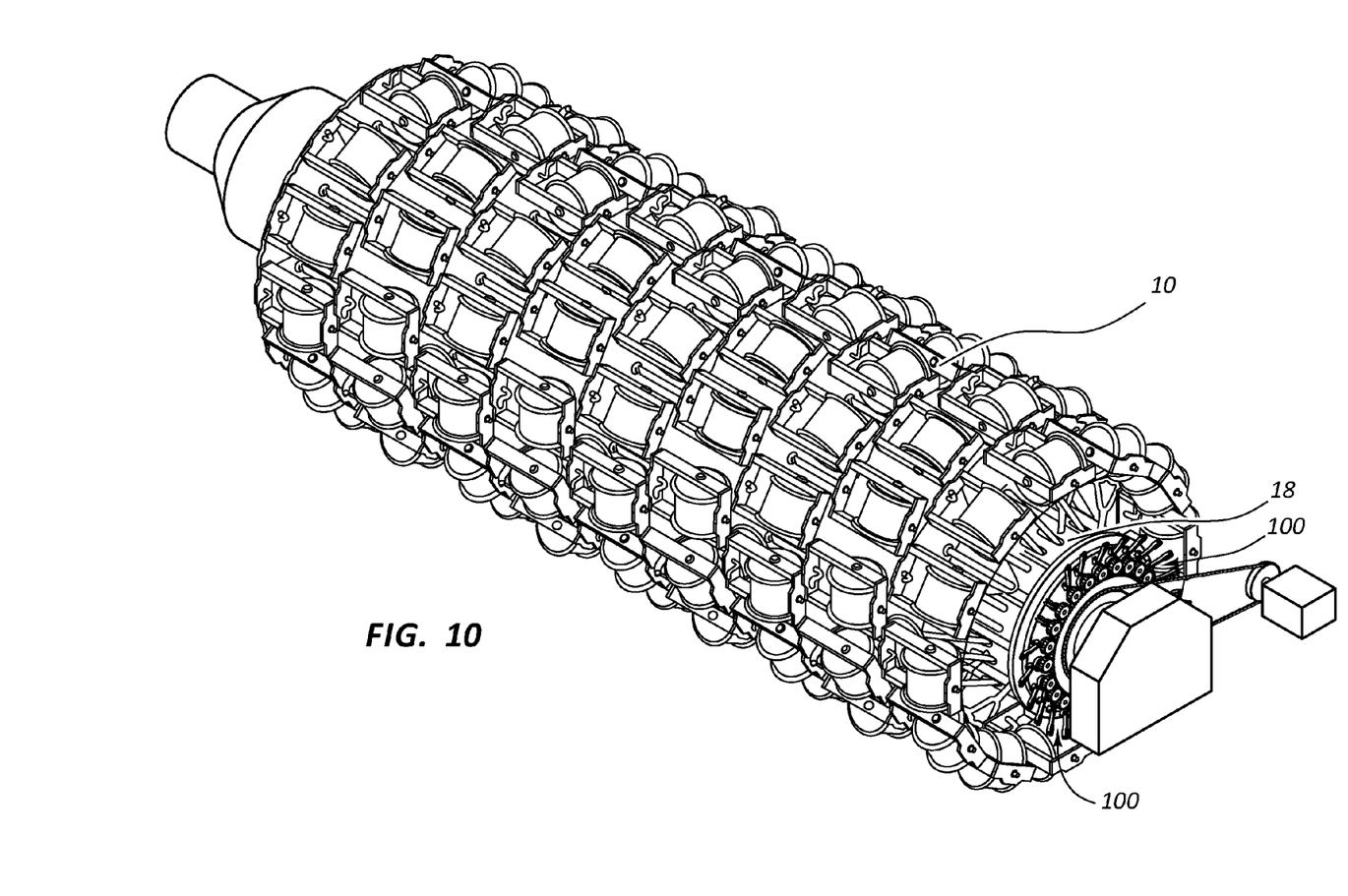
FIG. 10 is a perspective view of a cage oriented in rigid mode for winding flat wire around a pipe in the center of the cage.
Figure 11:
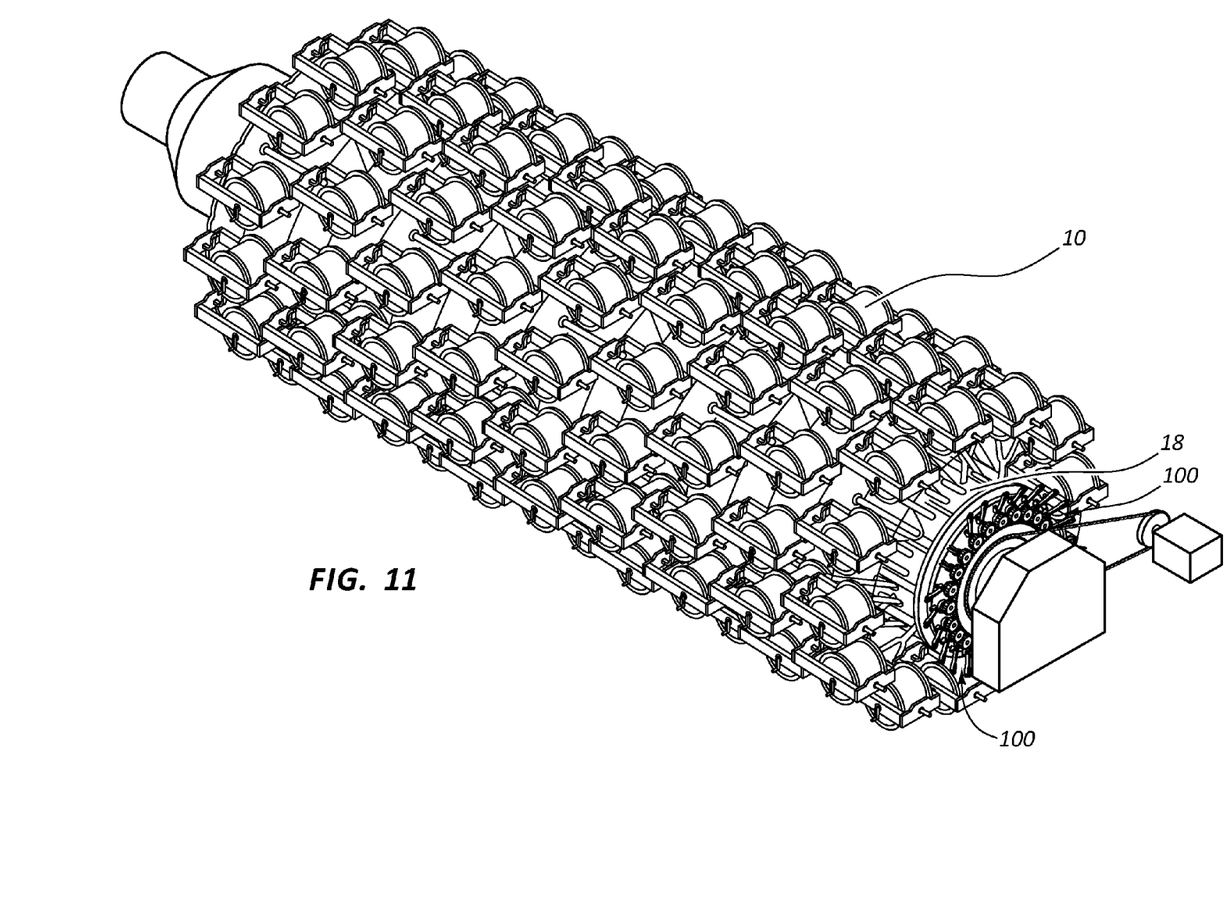
FIG. 11 is a perspective view of a cage oriented in planetary mode for winding round wire around a pipe in the center of the cage.
Figure 12:
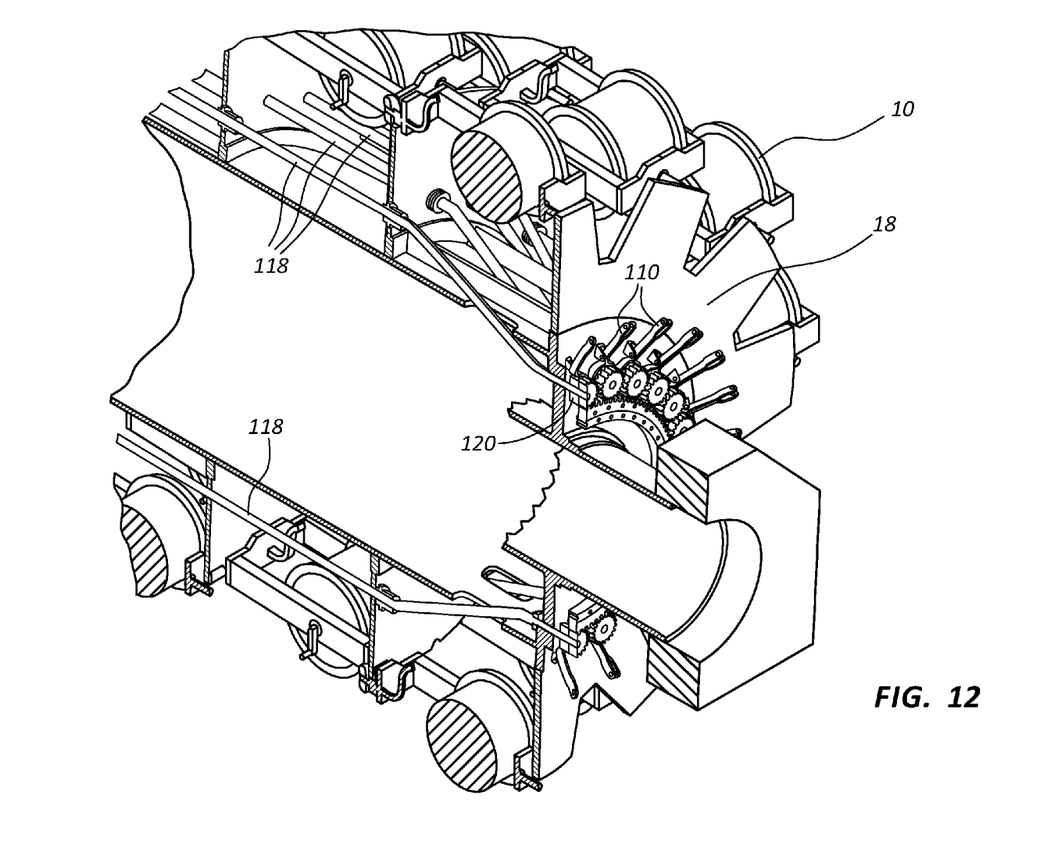
FIG. 12 is a cross-section, perspective view with a close-up of line shafts that drive bobbin motion of the bobbin cradle sets in an umbilical feeder machine.

The disclosed mode shift apparatus provides a system that facilitates a sequence of automated or manual steps to decouple bobbin cradle sets 10 from planetary pinion gears (arranged for planetary motion) and lock the bobbin cradle sets 10 into stationary positions on a cage 18 relative to a machine center axis, arranged for rigid armoring motion at required orientations with respect to the center axis. The cage 18 holds the bobbin cradle sets 10 and rotates independently of the pipe or wire that is being wound. The bobbin cradle sets 10 hold spools of wire used for winding the pipe or cable, which is best seen in FIGS. 10 through 12. FIG. 12 shows a close-up of line shafts that drive bobbin motion of the bobbin cradle sets in an umbilical feeder machine.

FIG. 10 shows the rigid armoring mode where the bobbin axes are all tangent to a cage on which the bobbin cradle sets are attached and are locked in place (do not rotate). The rigid armoring mode is normally used to wrap flat wire around a pipe or cable. The rigid motion allows the rectangular, flat wire to be positioned onto the pipe or cable in the proper orientation.

FIG. 11 shows the planetary mode where the bobbin axes are parallel to the ground, and maintain this orientation during operation due to the ability to rotate in step with pinion gears 114 via line shafts 118 as the pinion gears 114 rotate by engaging a cogwheel 28 (FIGS. 13-14), which times the rotations of respective pinion gears 114. The planetary motion is normally used to wind round wire onto a pipe or cable. The planetary motion allows the round wire to be positioned onto the pipe or cable without twisting around its centerline.

The sequence of steps are carried out utilizing a combination of planetary and rigid motions by using a coupler device, referred to generally herein as a coupler. The motions are achieved by using intrinsic function of the umbilical stranding machine, without independently rotating the bobbin cradle sets using an outside source of motion. In other words, the coupler and sequence allow the normal operating motions of the stranding machine to achieve the desired orientation change of the bobbin cradle sets when changing to/from planetary/rigid modes, as will be explained.

Using the normal operating motions of the stranding machine without requiring a separate power/motion source configured only to rotate the bobbins to the required orientations during mode change provides value in the disclosed design. Furthermore, the ability to seamlessly transition between planetary and rigid motion positions of the couplers enables shifting the bobbin cradle sets between round wire with preforming (planetary mode) and flat wire with preforming (rigid mode), thus configuring the same umbilical stranding machine to be able to wind both kinds of wire.

Figure 1:
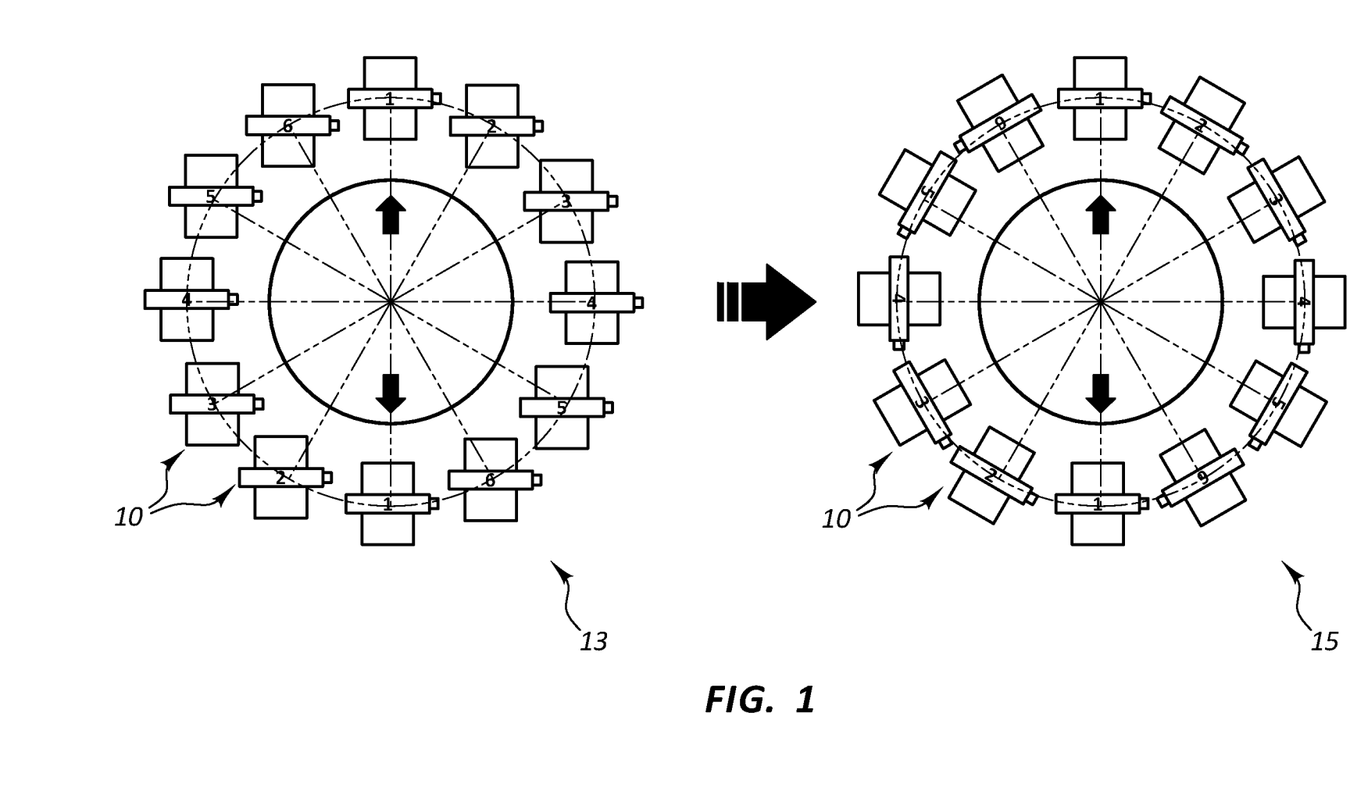
FIG. 1 is a cross-section view of bobbin cradle sets as oriented on a cage, showing a transition between planetary positions and rigid positions.

FIG. 1 is a cross-section view of bobbin cradle sets 10 as oriented on a cage 18 (FIG. 3), showing a transition between planetary positions 13 and rigid positions 15. A detailed explanation of this process is discussed with reference to FIG. 8.

Figure 2:
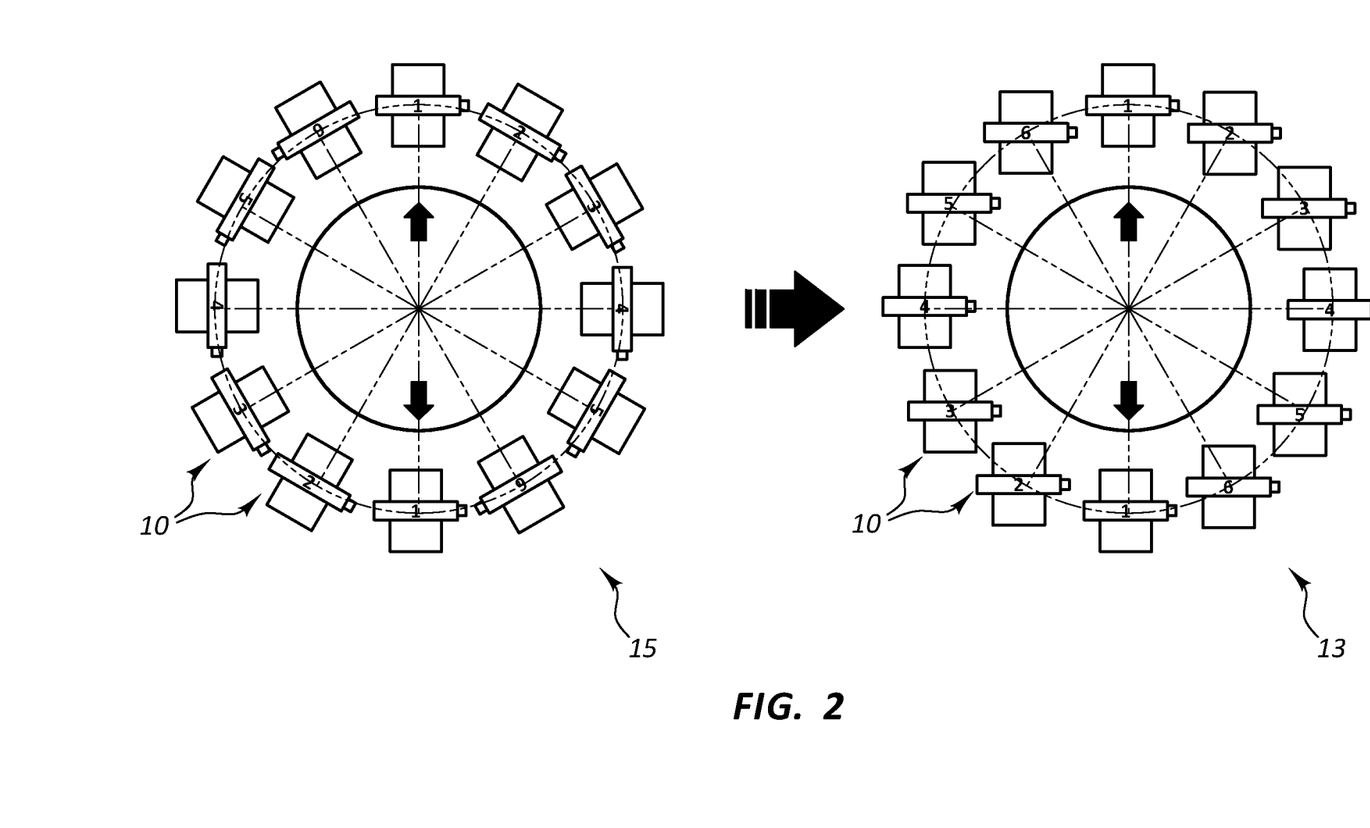
FIG. 2 is a cross-section view of bobbin cradle sets positioned in a circle as shown in FIG. 1, but showing a transition between rigid positions and planetary positions.

FIG. 2 is a cross-section view of bobbin cradle sets 10 positioned in a circle as shown in FIG. 1, but showing a transition between rigid positions 15 and planetary positions 13. A detailed explanation of this process is discussed with reference to FIG. 9.

Figure 3:
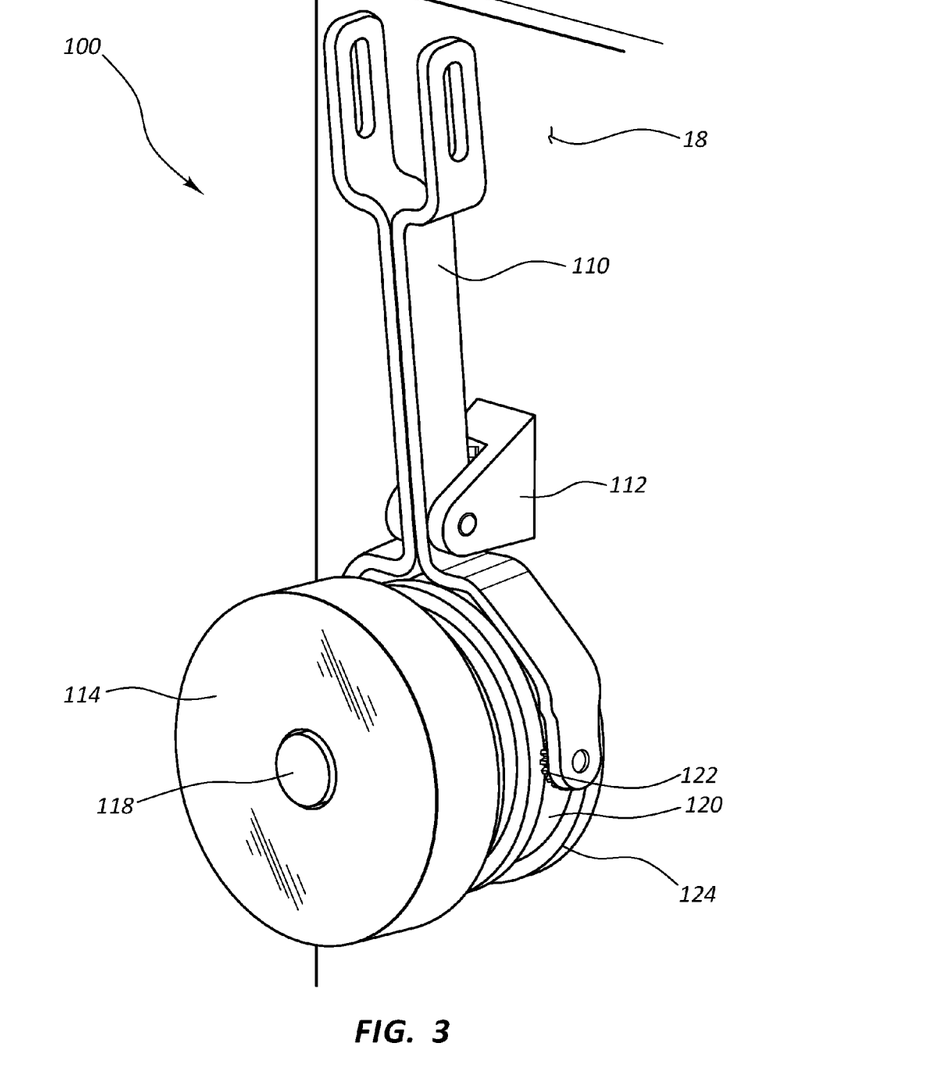
FIG. 3 is a perspective view of one of the couplers shown in FIGS. 1 and 2.
Figure 4:
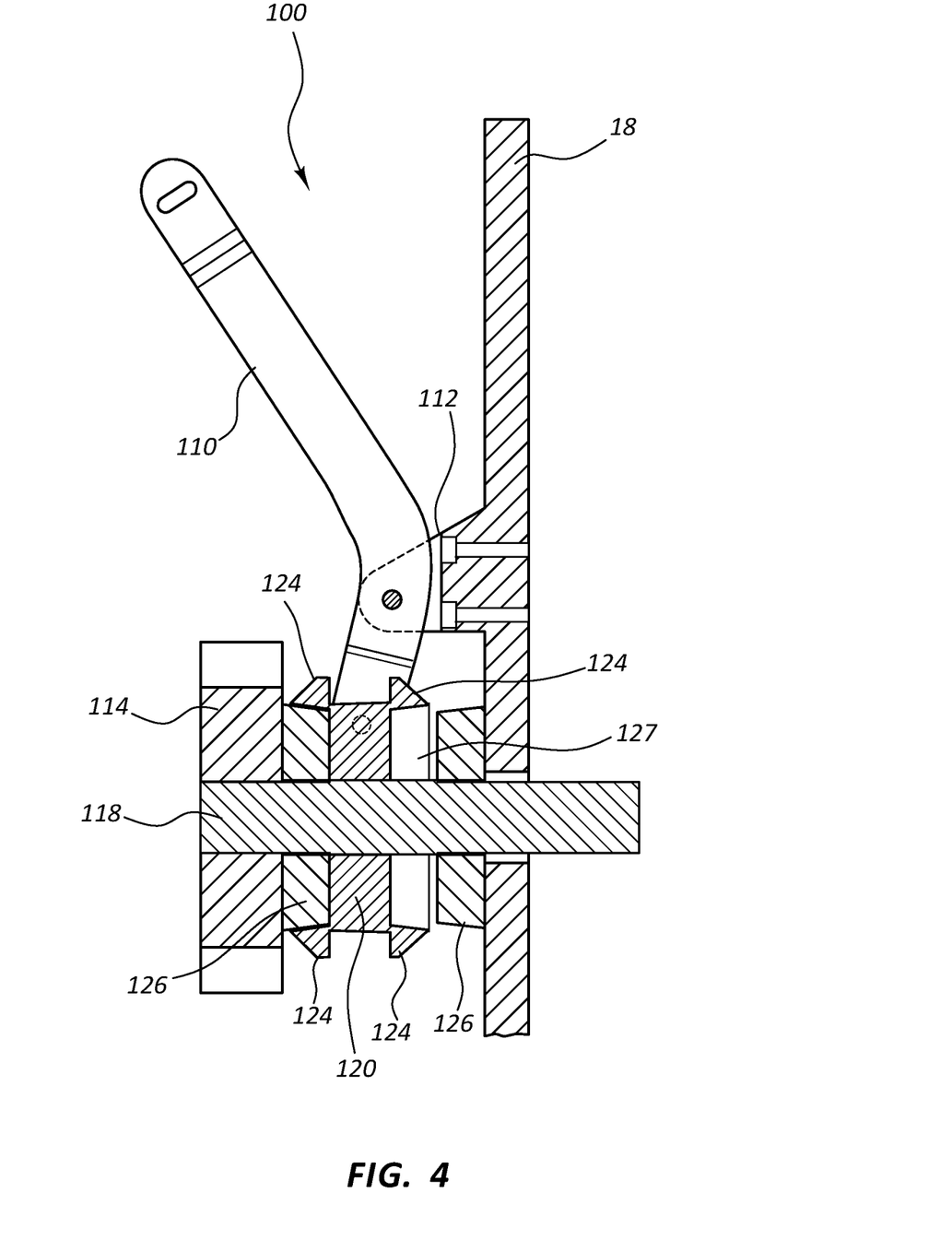
FIG. 4 is a cross-section view of the coupler of FIG. 3 in planetary mode position.

FIG. 3 is a perspective view of one of the couplers 100 shown in FIGS. 1 and 2. FIG. 4 is a cross-section view of the coupler of FIG. 3 in planetary mode position. The coupler 100 is attached to the cage 18 with use of a bracket 112. The coupler includes a lever 110 that can be actuated at one end and fans in a semi-circle shape around a coupler block 120.

The coupler block 120 is shown as cylindrical but can be of other shapes, such as square or oval. The coupler 100 also includes a pinion gear 114, e.g., a bearing-mounted planetary pinion gear 114 and a line shaft 118. The coupler block 120 slides on the line shaft 118 between locking features on both the cage 18 and pinion gear 114. The locking features may include, for example, lugs 126 attached to both the cage 18 and the pinion gear 114. The coupler block 120 may include hollow sections 127 shaped to fit tightly onto the lugs 126.

The lever 110 determines the position of the coupler block 120 on the line shaft 118 with two opposing cam followers 122 that engage the coupler block 120. More specifically, the cam followers 122 are configured to engage raised splines 124 formed on outside edges of the coupler block 120. For example, the cam followers 122 may engage an inside one of the splines 124 to move the coupler block onto the cage 18 (rigid mode) or engage an outside one of the splines 124 to move the coupler block onto the pinion gear 114 (planetary mode).

When in planetary mode, the coupler block 120 provides an engagement between the line shaft 118 and the pinion gear 114, thus allowing the pinion gears to rotate the bobbin cradle sets 10 via the line shaft 118. When in rigid mode, the coupler block 120 is coupled to the cage 18, which keeps the bobbin cradle sets 10 from spinning and which then remain rigid with respect to the cage.

Figure 13:
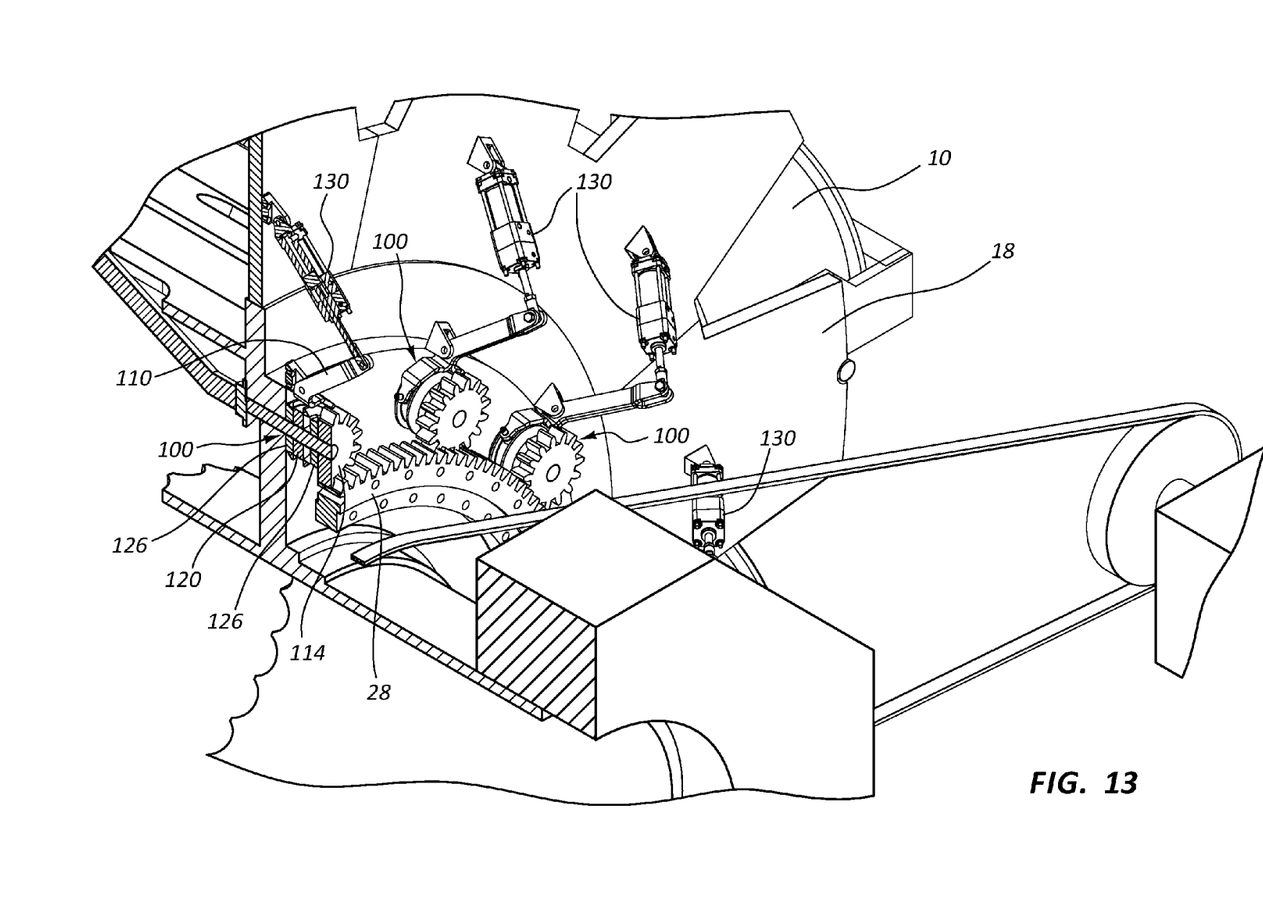
FIG. 13 is a cut-away view of FIG. 12 with the addition of actuators to the ends of the levers of the couplers.
Figure 14:
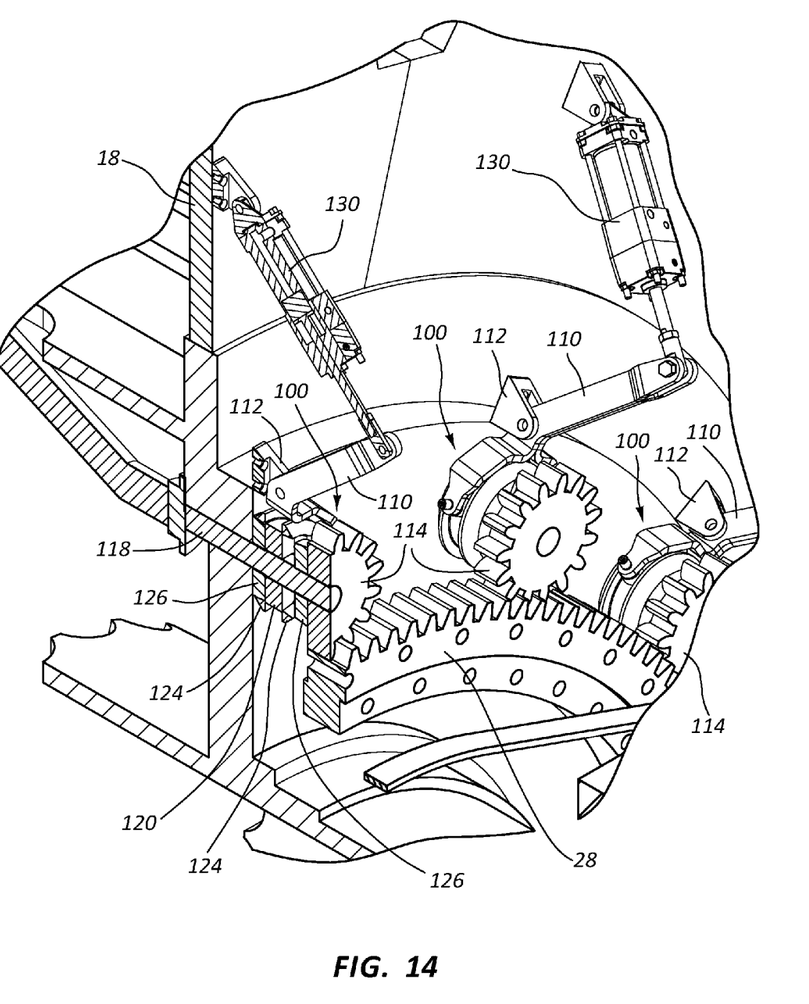
FIG. 14 is a blow-up view of the center portion of FIG. 13.

The lever 110 is fixed to the cage 18 by a pivot point at the bracket 112 that provides a force, which causes the coupler block 120 to transition from being coupled to the pinion gear to being coupled to the cage 18; or to transition from being coupled to the cage to being coupled to the pinion gear 114. The lever 110 can be actuated in several ways, including but not limited to being actuated manually, e.g., through an over-center lever, or automated actuation through an actuator 130 (FIGS. 13 and 14) such as, but not limited to, an air cylinder, an electric linear actuator, a lead screw, or other actuator 130. FIGS. 13 and 14 show an example of use of locking air cylinders as actuators 130.

As mentioned, the lock feature on both the cage 18 and planetary pinion gear 114 may include a lug 126, e.g., a drafted symmetrical lug 126 (FIGS. 4-6) that fits into corresponding hollow sections 127 on either side of the coupler block 120, to prevent rotation between the coupler block 120 and either the cage 18 or the pinion gear 114, once engaged. The lug 126 may be attached to, respectively, the cage 18 and the pinion gear 114. The hollow sections 127 of the coupler block 120 may fit over and be configured to engage the lugs 126 when moving between rigid and planetary mode positions and vice versa.

Figure 5:
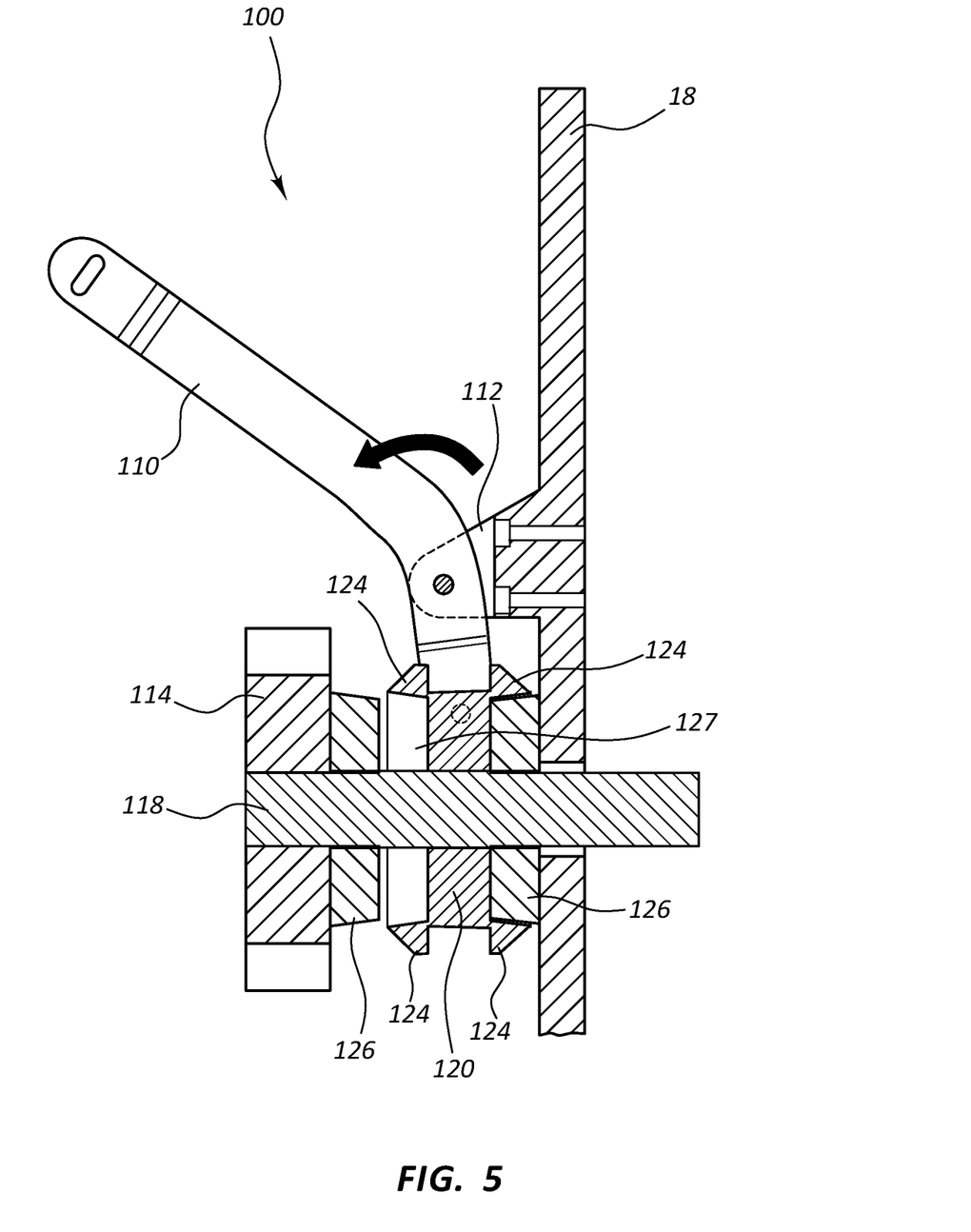
FIG. 5 is a cross-section view the coupler of FIG. 4 being transitioned between the planetary mode position and a rigid mode position with movement of a lever of the coupler.
Figure 6:
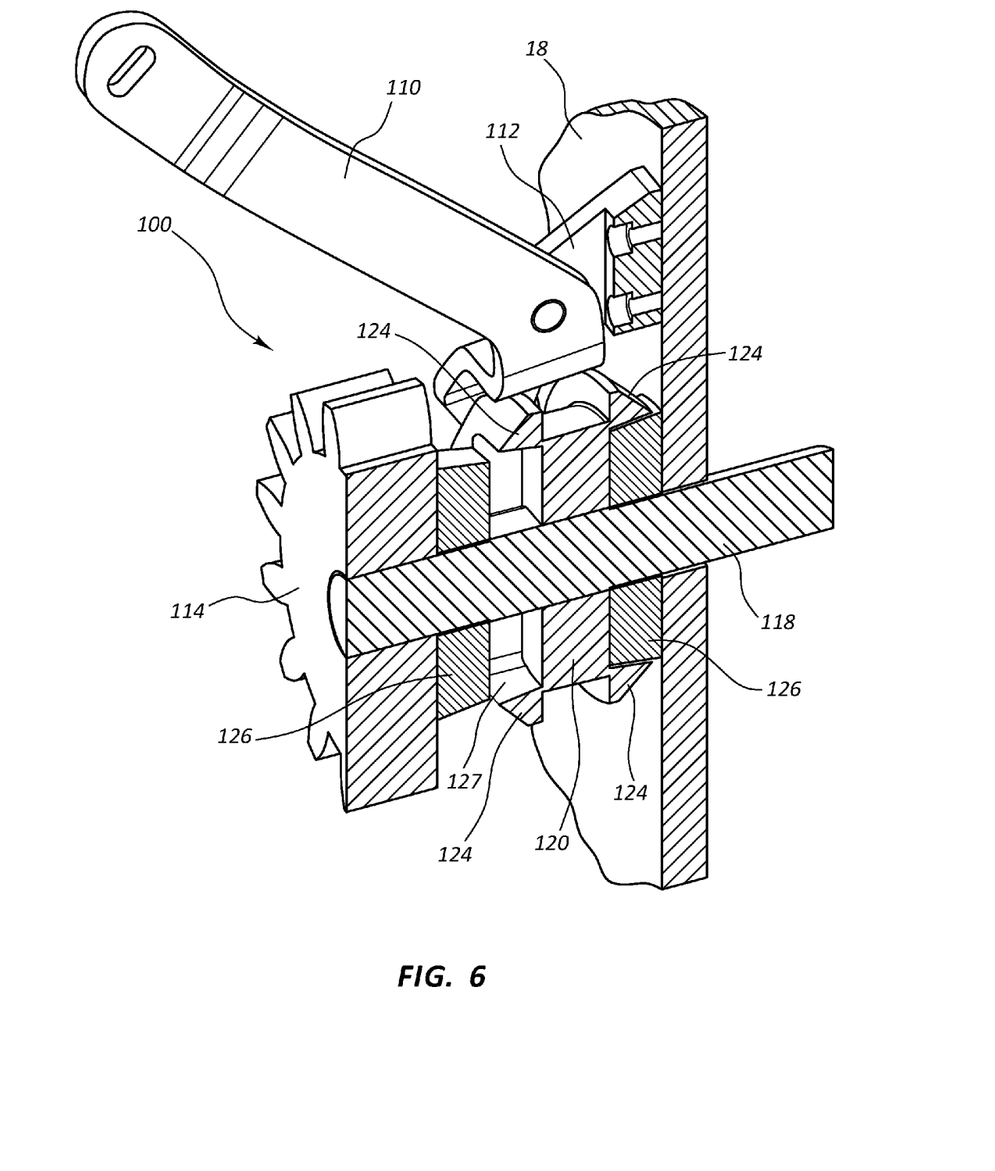
FIG. 6 is a cross-section view of the coupler of FIG. 3 in rigid mode position.
Figure 7:
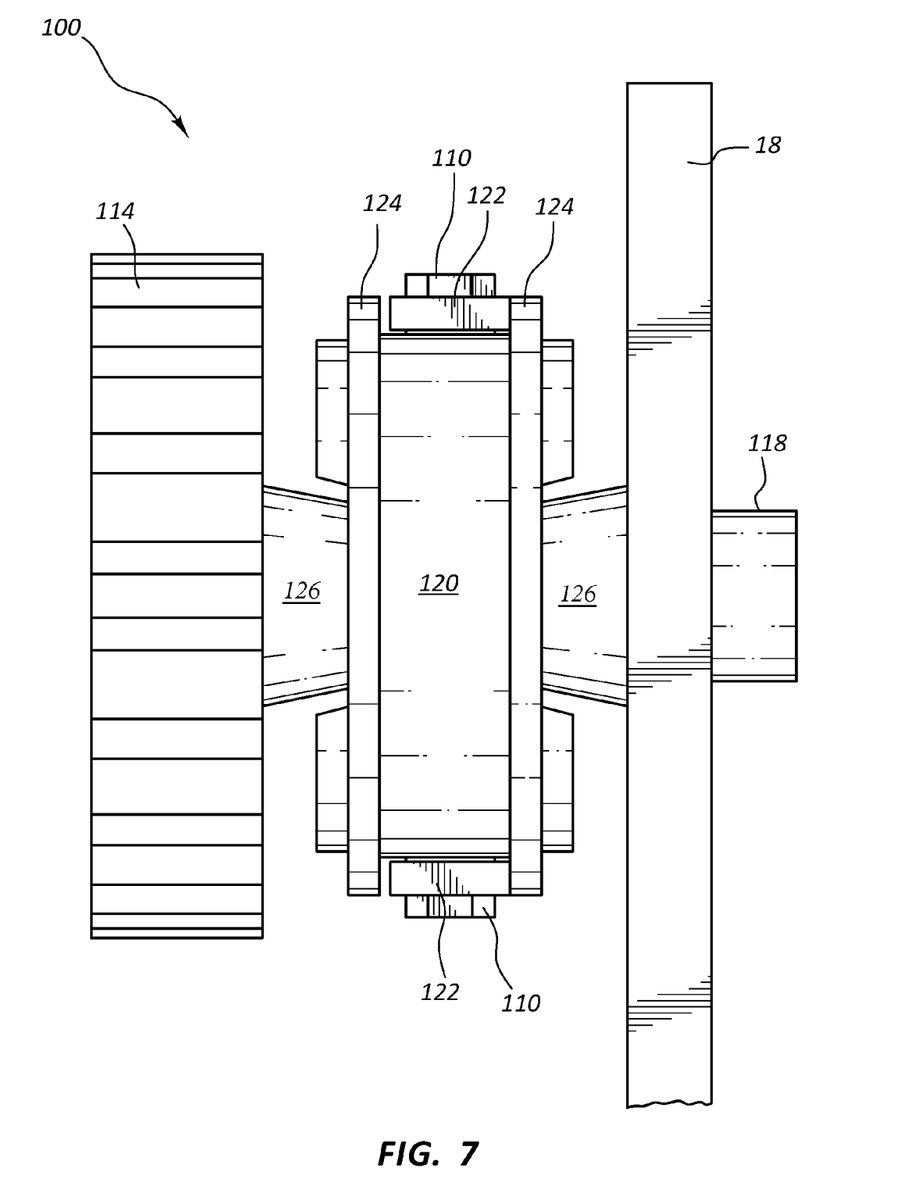
FIG. 7 is a bottom view of the coupler of FIG. 3.

FIG. 5 is a cross-section view of the coupler 100 of FIG. 4 being transitioned between the planetary mode position 13 and a rigid mode position 15 with movement of the lever 110. The lever 110, through pivoting about the bracket 112, moves the coupler block 120 over the line shaft 118 from being attached or coupled to the pinion gear 114 (FIG. 4, planetary mode) to being attached or coupled to the cage 18 (FIGS. 5-6, rigid mode). FIG. 6 is a cross-section view of the coupler 100 of FIG. 3 in rigid mode position 15. Note that now the hollow section 127 of the coupler block 120 engages the lug 126 on cage 18. FIG. 7 is a bottom view of the coupler of FIG. 3 with the same components as identified in FIG. 3, where the coupler block 120 is in between modes in being between the lugs 126.

Figure 8:
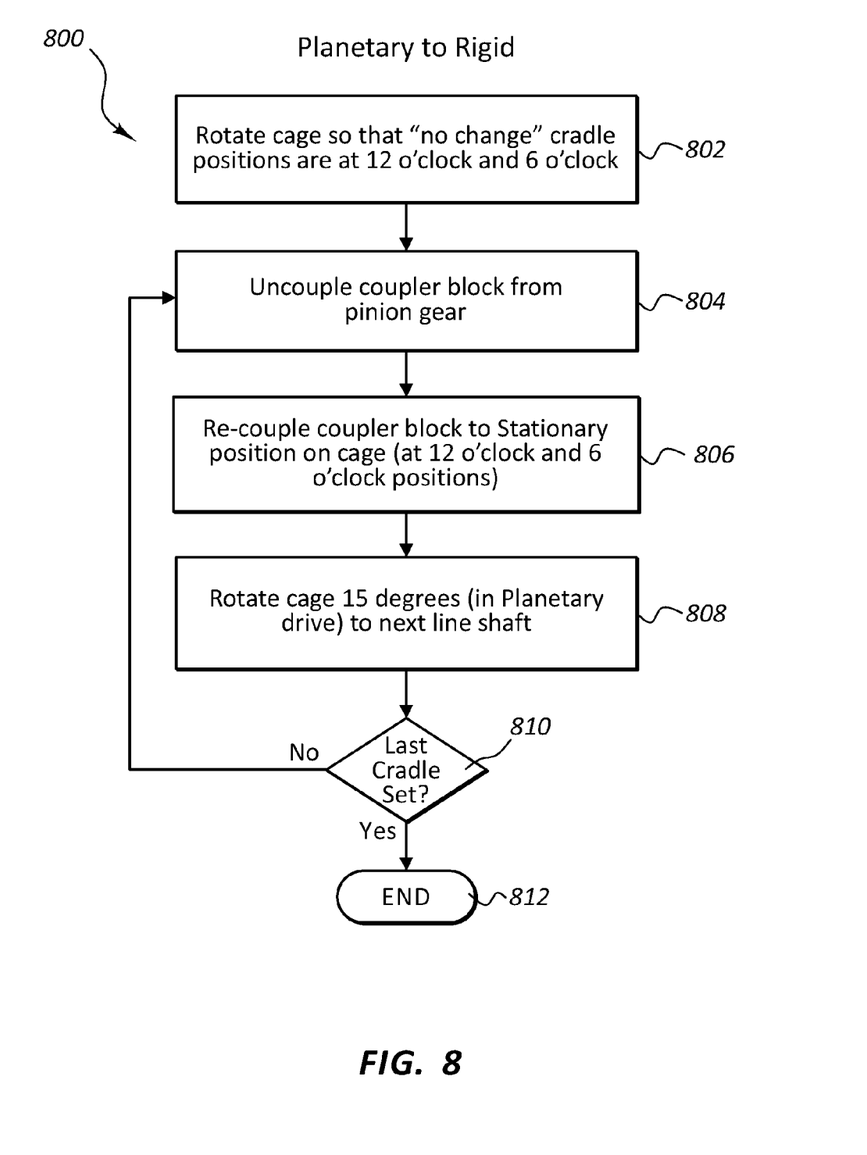
FIG. 8 is a flow chart of a process by which the bobbin cradle sets of FIG. 1 are changed from planetary mode to rigid mode positions with the coupler.

FIG. 8 is a flow chart of a process 800 by which the bobbin cradle sets 10 of FIG. 1 are changed from planetary mode to rigid mode positions with the coupler 100. The cage is rotated so that the "no change" cradle positions (#1 in FIG. 1) are at 12 o'clock and 6 o'clock (802). The coupler block is uncoupled from the planetary pinion gear with the lever (804) and re-coupled to a stationary (or rigid) position on the cage 18, which occurs at 12 o'clock and 6 o'clock positions (806). The cage is then rotated 15 degrees (in planetary drive) to the next line shaft (808). When all of the cradle sets have been shifted to the rigid positions (810), the process ends (812).

Figure 9:
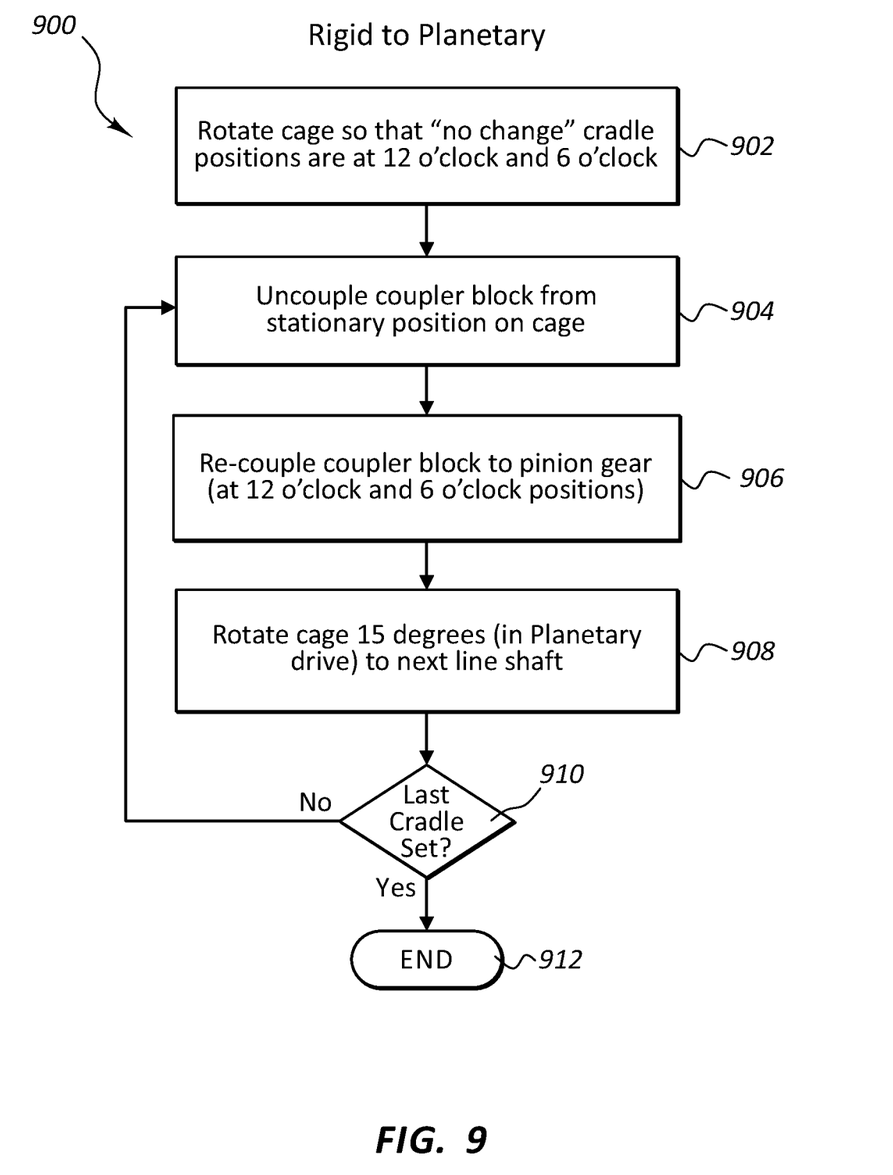
FIG. 9 is a flow chart of a process by which the bobbin cradle sets of FIG. 2 are changed from rigid mode to planetary mode positions with the coupler.

FIG. 9 is a flow chart of a process 900 by which the bobbin cradle sets 10 of FIG. 2 are changed from rigid mode to planetary mode positions with the coupler 100. The cage is rotated so that the "no change" cradle positions (#1 in FIG. 2) are at 12 o'clock and 6 o'clock (902). The coupler block is uncoupled from the stationary (or rigid) position on the cage (904) and re-coupled to the planetary pinion gear (906), which occurs at the 12 o'clock and 6 o'clock positions. The cage 18 is then rotated 15 degrees (in planetary drive) to the next line shaft (908). When all of the cradle sets have been shifted to the planetary positions (910), the process ends (912).

The terms and descriptions used herein are set forth by way of illustration only and are not meant as limitations. Those skilled in the art will recognize that many variations can be made to the details of the above-described embodiments without departing from the underlying principles of the disclosed embodiments. For example, the steps of the methods need not be executed in a certain order, unless specified, although they may have been presented in that order in the disclosure. The scope of the invention should, therefore, be determined only by the following claims (and their equivalents) in which all terms are to be understood in their broadest reasonable sense unless otherwise indicated.

The invention claimed is:

1. A coupler for shifting bobbin cradle sets between planetary and rigid mode positions on an umbilical stranding machine, the coupler comprising:
   a lever;
   a pinion gear;
   a line shaft positioned through a center of the pinion gear and a cage of the stranding machine;
   a coupler block slidable over the line shaft and engageable with the pinion gear to rotate a set of bobbin cradles via the pinion gear and line shaft; and
   opposing cam followers controllable with the lever that engage splines of the coupler block, to shift the coupler block back and forth between being coupled to the pinion gear for planetary mode and coupled to the cage for rigid mode.

2. The coupler of claim 1, where the coupler block defines first and second hollow sections, further comprising:
   a first lug attached to the pinion gear configured to receive the first hollow section in planetary mode; and
   a second lug attached to the cage configured to receive the second hollow section in rigid mode.

3. The coupler of claim 2, where when the cam followers engage the splines of the coupler block, the coupler block slides over the line shaft between the planetary and rigid modes as controlled by the lever.

4. The coupler of claim 1, further comprising:
   a bracket attached to the cage, where the lever is configured to engage the bracket as a pivot point that provides a force, which causes the coupler block to transition from being coupled to the pinion gear to being coupled to the cage; or to transition from being coupled to the cage to being coupled to the pinion gear.

5. The coupler of claim 4, where when the lever is moved away from the cage, the coupler block is placed into rigid mode.

6. The coupler of claim 4, where when the lever is moved towards the cage, the coupler block is placed into planetary mode.

7. The coupler of claim 1, further comprising:
an aperture defined in the lever at an opposite end from the cam followers.

8. An umbilical stranding machine comprising the bobbin cradle sets, the cage and a plurality of the couplers of claim 7, further comprising:
a plurality of actuators, each respective actuator configured to engage the aperture in a respective lever of the couplers, to automate shifting between planetary and rigid modes for respective couplers; and
a cogwheel against which the pinion gears of the plurality of couplers rotate to time movement of the bobbin cradle sets in planetary mode.

9. A coupler for shifting bobbin cradle sets between planetary and rigid mode positions on an umbilical stranding machine that includes a cage, the coupler comprising:
a pinion gear;
a line shaft positioned through a center of the pinion gear and through the cage of the stranding machine;
a coupler block slidable over the line shaft and positioned between the cage and the pinion gear, the coupler block defining first and second hollow sections, the first hollow section engageable with the pinion gear to rotate a set of bobbin cradles via the pinion gear and the line shaft;
a first lug attached to the pinion gear configured to receive the first hollow section in planetary mode; and
a second lug attached to the cage configured to receive the second hollow section in rigid mode.

10. The coupler of claim 9, further comprising:
a lever, where the lever is configured to engage raised splines of the coupler block to shift the coupler block back and forth between being coupled to the pinion gear for planetary mode and coupled to the cage for rigid mode.

11. The coupler of claim 10, where the lever includes two halves, each half including a cam follower at a first end thereof that engages the splines at opposing sides of the coupler block, to force the coupler block to slide over line shaft.

12. The coupler of claim 11, where the halves of the lever each include an aperture at a second end thereof configured to be engageable by an actuator to automate shifting between planetary and rigid modes.

13. The coupler of claim 11, further comprising:
an actuator configured to move the lever.

14. The coupler of claim 13, further comprising:
a bracket attached to the cage, where the lever is configured to engage the bracket as a pivot point that provides a force, which causes the coupler block to transition from being coupled to the pinion gear to being coupled to the cage; or to transition from being coupled to the cage to being coupled to the pinion gear.

15. The coupler of claim 14, where when the lever is moved away from the cage, the coupler block is placed into rigid mode.

16. The coupler of claim 14, where when the lever is moved towards the cage, the coupler block is placed into planetary mode.

17. A stranding machine comprising the bobbin cradle sets, the cage and a plurality of the couplers of claim 9, further comprising:
a cogwheel against which the pinion gears of the plurality of couplers rotate to time movement of the bobbin cradle sets in planetary mode.

18. A method of shifting bobbin cradle sets between planetary and rigid mode positions on an umbilical stranding machine, comprising:
(i) rotating a cage of the stranding machine to a pair of no change cradle positions;
(ii) uncoupling a coupler block from a planetary mode position on a pinion gear of a coupler;
(iii) re-coupling the coupler block to a rigid mode position on the cage of the stranding machine, where the uncoupling and the re-coupling is performed with a lever of the coupler that engages a spline of the coupler block;
(iv) rotating the cage fifteen degrees in planetary drive to a next line shaft of a next coupler; and
(v) repeating steps (ii) to (iv) until all cradle sets have been shifted to rigid mode positions.

19. A method of shifting bobbin cradle sets between rigid and planetary mode positions on an umbilical stranding machine, comprising:
(i) rotating a cage of a stranding machine to a pair of no change cradle positions;
(ii) uncoupling a coupler block from a rigid mode position on a cage of the stranding machine;
(iii) re-coupling the coupler block to a planetary mode position on a planetary pinion gear of the coupler, where the uncoupling and the re-coupling is performed with a lever of the coupler that engages a spline of the coupler block;
(iv) rotating the cage fifteen degrees in planetary drive to a next line shaft of a next coupler; and
(v) repeating steps (ii) to (iv) until all cradle sets have been shifted to planetary mode positions.

* * * * *